United States Patent
Vadla Ravnas (10) Patent No.: US 9,621,603 B2
(45) Date of Patent: *Apr. 11, 2017

(54) METHOD FOR PAIRING A COMPUTER WITH A VIDEO CONFERENCE DEVICE

(71) Applicant: Cisco Technology, Inc., San Jose, CA (US)

(72) Inventor: Ole Andre Vadla Ravnas, Tau (NO)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/586,301

(22) Filed: Dec. 30, 2014

(65) Prior Publication Data

US 2015/0120838 A1 Apr. 30, 2015

Related U.S. Application Data

(63) Continuation of application No. 13/008,624, filed on Jan. 18, 2011.
(Continued)

(30) Foreign Application Priority Data

Jan. 18, 2010 (NO) .................................. 20100079

(51) Int. Cl.
*H04L 29/06* (2006.01)
*G06Q 10/10* (2012.01)
(Continued)

(52) U.S. Cl.
CPC ........... *H04L 65/403* (2013.01); *G06Q 10/10* (2013.01); *H04L 12/1818* (2013.01);
(Continued)

(58) Field of Classification Search
None
See application file for complete search history.

(56) References Cited

U.S. PATENT DOCUMENTS 8,171,292 B2 * 5/2012 Brown .................. H04L 9/0844
380/223
9,105,487 B2 * 8/2015 Schulze ............. H01L 29/0619
(Continued)

FOREIGN PATENT DOCUMENTS

CN 101599948 12/2009
EP 1528769 5/2005
(Continued)

OTHER PUBLICATIONS

International Search Report and Written Opinion cited in Application No. PCT/NO2010/000485, issued Apr. 14, 2011.
(Continued)

*Primary Examiner* — Andrew Lai
*Assistant Examiner* — Jamaal Henson
(74) *Attorney, Agent, or Firm* — Lempia Summerfield Katz LLC (57) ABSTRACT

A method includes generating a random identification token on a computer that identifies the computer; modulating the identification token to an audio signal on the computer; causing, with the computer, a speaker to emit the audio signal receiving, at video conference device, the audio signal with a microphone associated with the video conference device; demodulating the audio signal to the identification token in the video conference device; sending at least the identification token and a unique identifier of the video conference device to the computer; and establishing a communication session through a communication network, that both the computer and video conference device are communicatively connected to, from the computer to the video
(Continued)

conference device enabling control of, and data transfer to, the video conference device from the computer.

15 Claims, 4 Drawing Sheets

Related U.S. Application Data (60) Provisional application No. 61/296,351, filed on Jan. 19, 2010.

(51) Int. Cl.
*H04L 12/18* (2006.01)
*H04W 4/20* (2009.01)

(52) U.S. Cl.
CPC ...... *H04L 65/1066* (2013.01); *H04L 65/1069* (2013.01); *H04L 65/4053* (2013.01); *H04W 4/206* (2013.01)

(56) References Cited

U.S. PATENT DOCUMENTS

| | | | | |
|---|---|---|---|---|
| 9,130,664 | B2* | 9/2015 | Jin | H04B 11/00 |
| 2005/0018687 | A1* | 1/2005 | Cutler | H04L 29/06027 |
| | | | | 370/395.2 |
| 2005/0190768 | A1* | 9/2005 | Cutler | H04L 29/06027 |
| | | | | 370/395.2 |
| 2005/0273609 | A1* | 12/2005 | Eronen | H04L 63/0428 |
| | | | | 713/171 |
| 2006/0282649 | A1* | 12/2006 | Malamud | H04L 63/0861 |
| | | | | 712/26 |
| 2008/0065727 | A1 | 3/2008 | Majors et al. | |
| 2009/0016728 | A1 | 1/2009 | Kindle | |
| 2009/0021575 | A1 | 1/2009 | Duddy et al. | |
| 2009/0034561 | A1* | 2/2009 | He | G02F 1/3526 |
| | | | | 372/3 |
| 2009/0034591 | A1* | 2/2009 | Julian et al. | 375/220 |
| 2009/0179983 | A1 | 7/2009 | Schindler | |
| 2009/0327426 | A1* | 12/2009 | Ramanathan | H04L 65/1059 |
| | | | | 709/205 |
| 2010/0281261 | A1 | 11/2010 | Razzell | |
| 2012/0128154 | A1 | 5/2012 | Ran | |

FOREIGN PATENT DOCUMENTS

| | | |
|---|---|---|
| EP | 1786145 | 5/2007 |
| EP | 1940115 | 7/2008 |
| WO | WO2009066212 | 5/2009 |
| WO | WO2011007254 | 1/2011 |

OTHER PUBLICATIONS

Norwegian Search Report and International Search Report in Application No. 20100079, mailed Jul. 6, 2010.

* cited by examiner

METHOD FOR PAIRING A COMPUTER WITH A VIDEO CONFERENCE DEVICE

CROSS-REFERENCE TO RELATED APPLICATIONS

The present application is a continuation under 37 C.F.R. §1.53(b) and 35 U.S.C. §120 of U.S. patent application Ser. No. 13/008,624 entitled "METHOD FOR PAIRING A COMPUTER WITH A VIDEO CONFERENCE DEVICE" and filed Jan. 18, 2011, which claims the benefit of provisional patent application 61/296,351, filed Jan. 19, 2010, the entire contents of both of which are hereby incorporated by reference. The present application also claims the benefit of priority under 35 U.S.C. §119 to Norwegian patent application no. NO20100079, filed Jan. 18, 2010, the entire contents of which are hereby incorporated by reference.

TECHNOLOGICAL FIELD

The exemplary embodiments described herein relate to video conferencing and data collaboration. An exemplary embodiment describes pairing personal computers and video conferencing devices.

BACKGROUND

Video conferencing systems are now widely being used as substitutes for personal communication and meetings. Video conferencing endpoints are often fixed installations in meeting rooms, offices and other office premises. Video conferencing endpoints may also be handheld portable devices.

Fixed installations limit mobility of the users. On the other hand, portable personal computers are widely being used and are often accompanying participants in video conference calls.

There is often a need for connecting computers and video conferencing endpoints, e.g. for displaying a presentation, sharing documents, or even accessing the endpoint's user interface through the computer. The connection is usually provided by a cable, e.g. an analog screen cable. Problems related to screen settings, interoperability and connectors may then occur. Analog cable connectors are also exposed to wear when frequently being connected and disconnected. Accessing the endpoint's user interface or transferring calls from the computer to the endpoint is only possible if the devices are aware of each other's network identities, and there is no way for the computer and endpoint to identify each other through a standard cable connection. Bluetooth is an open wireless protocol for exchanging data over short distances using short length radio waves from fixed and mobile devices, creating personal area networks (PANs). It was originally conceived as a wireless alternative to data cables. As Bluetooth is limited to PANs it is not able to operate on LANs or WANs or fetch network addresses. Conventional video conference endpoints are usually not Bluetooth enabled, neither are all computers, which may also be difficult to configure correctly.

SUMMARY

An exemplary embodiment is a method including: generating a random identification token on a computer, said identification token identifying the computer; modulating the identification token to an audio signal on the computer; causing, with the computer, a speaker to emit the audio signal; receiving, at video conference device, the audio signal with a microphone associated with the video conference device; demodulating the audio signal to the identification token in the video conference device; sending at least the identification token and a unique identifier of the video conference device to the computer; and establishing a communication session through a communication network, that both the computer and video conference device are communicatively connected to, from the computer to the video conference device enabling control of, and data transfer to, the video conference device from the computer.

Methods described herein may also be embodied as computer executable instructions encoded a non-transitory computer readable storage medium.

Another exemplary embodiment is a system including: a computer; and a video conferencing device communicatively coupled to the computer through a communication network, wherein the computer is configured to generate a random identification token, said identification token identifying the computer, the computer is configured to modulate the identification token to an audio signal, the computer is configured to cause a speaker to emit the audio signal, the video conference device is configured to receive4 the audio signal with a microphone associated with the video conference device, the video conference device is configured to demodulate the audio signal to the identification token, the video conference device is configured to send at least the identification token and a unique identifier of the video conference device to the computer, and the computer is configured to establish a communication session through the communication network, that enables control of, and data transfer to, the video conference device from the computer.

BRIEF DESCRIPTION OF THE DRAWINGS

In order to make the exemplary embodiments more readily understandable, the discussion that follows will refer to the accompanying drawings, which include.

DETAILED DESCRIPTION

In the following, exemplary embodiments of the present technological advancement will be discussed. However, people skilled in the art will realize other applications and modifications within the scope of the invention as defined in the enclosed independent claims.

An exemplary embodiment includes a method and a computer readable storage medium in a computer for pairing the computer and a video conferencing device (endpoint, terminal, client} by emitting encoded and/or modulated sound from the computer's speaker being captured by microphones of the video conferencing devices in proximity. The encoded/modulated sound includes a special signature recognizable for pairing compatible devices followed by a randomly generated identification token generated by the computer. Assuming that both the computer and the nearby endpoints are connected to the same communication network like a LAN, WLAN or WAN, video conference entities will be able to identify, be aware of and access each other.

Figure 1:
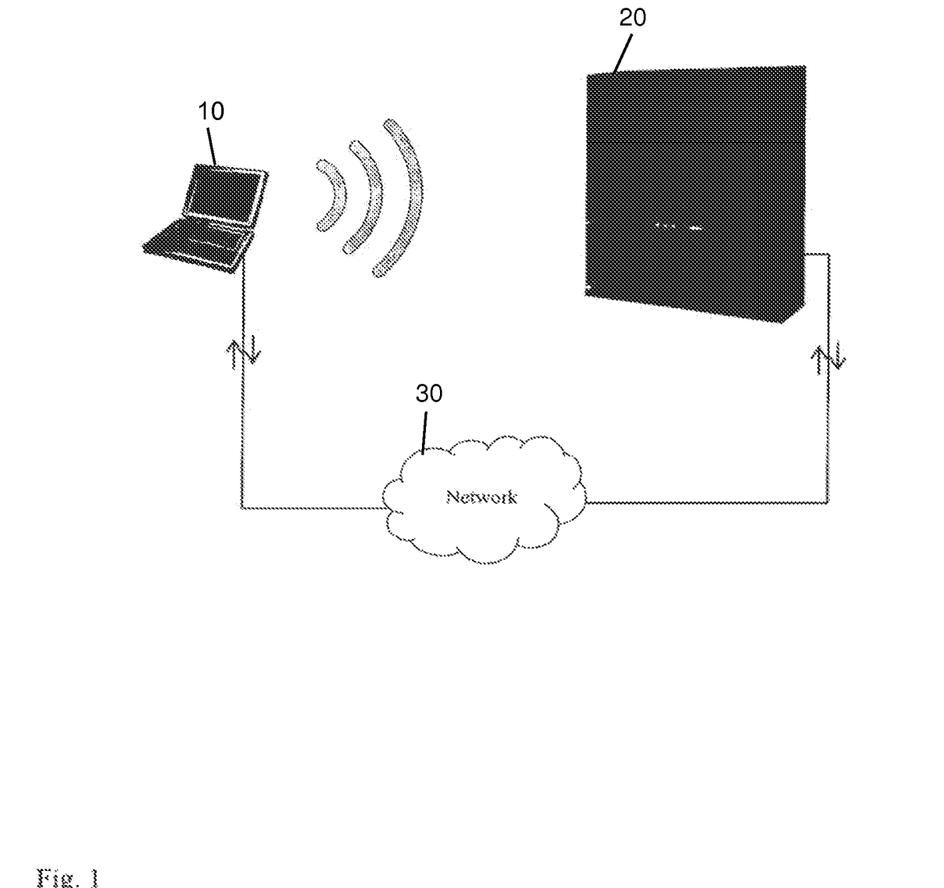
FIG. 1 is an illustration of a pairing situation between a computer and a video conference device according to an exemplary embodiment.

FIG. 1 is an illustration of a pairing situation between a computer 10 and a video conference device 20 via network 30 according to an exemplary embodiment. A video conference device may be a stationary video conference endpoint, or a mobile device that function as video conference endpoint.

An exemplary embodiment includes a computer software client application, a server and a number of video conferencing devices. The client application is at least able to generate a random identification token by using the underlying operating system's APIs. The client application is further adjusted to modulate and/or code the identification token in a sound which is emitted from the computer's loudspeaker. The code has a heading with a signature unique for the system or application recognizable for system compatible devices. The client application should also have a User Interface through which a user can interact with the system. For example, when a user carrying his computer enters a meeting room with a video conferencing device installed, he should be able to initiate pairing with the endpoint through the User Interface. Alternatively, the application could by default regularly send out modulated/coded sound to exhibit its presence to nearby devices. The application must include a transmission routine being able to encode and/or modulate the identification token to audio that is emittable from the computer's load speaker. Many modulation techniques could be used, including Phase Skift Key (PSK) or Frequency Skift key (FSK). The audio may or may not be perceivable by the human ear, but the frequencies should preferably lie within the frequency area of conventional video conferencing microphones.

A device compatible with the system will have a software routine installed adjusted to continuously receive signals from a microphone connected to or integrated in the device. As the routine recognizes the signature sound, it starts demodulating and/or decoding the following audio using the demodulation and/or decoding technique being set for the system. The routine should also be able to sense the sound level of the audio with the recognizable signature. Once the computer identification and sound level is provided, the computer identification token, the sound level and the device identification (being e.g. the IP address of the endpoint) will be transmitted back to the computer. There are several ways of reaching the computer. If both the video conference device and the computers are connected to a relatively small LAN, the data can be broadcasted to all entities in the LAN. The video conference device does not have to be aware of which computers are registered in the system. It does not even have to be aware of the computer's identity, as it can simply transfer the demodulated/decoded data to the entire LAN network, and the computer initiating the pairing will be listening for broadcast messages on the network, and fetching them as they appear. As such messages contain the identification token they are responses for, the software will be able to disregard responses intended for other computers. In the case of a larger LAN, a different solution could be used. In such a case, the computer software could use IETF's Zeroconf standard to contact a server and register its interest in such messages. Such a request could include the identification token about to be modulated/encoded, so the server can send the response only to the computer that emitted the audio signal.

When the client application installed on the computer receives the data originating from its own pairing call, the software uses the identity to contact the device from which the data was sent over the network, typically determines the make and model, and presents the device in the User Interface. If the computer receives data from more than one device within a limited time period, the application can use the sound level measured by the respective devices to sort them in a list in the User Interface. The user is then invited to select the one device with which he/she would like to pair his/her computer.

When the preferred device has been selected, the application establishes a communication session between the computer and the device, e.g. through a well-defined protocol run over TCP/IP. The device can then be controlled by the application from the computer e.g. at the same level as a conventional remote control. Control functions such as placing a call, adjusting volume, camera control are obvious features that should be available through the User Interface.

As an alternative to a direct communication session between the computer and the device, the computer could also get access to the device through an existing video conferencing management programs/suits by installing a proxy application on a server. The proxy application may be able to receive and parse instructions from the client application translate them to instructions compliment with the video conference management program, and act and respond accordingly. Video conferencing managing programs typically have access to and are able to control most telecommunication units and network resources within a corporation and an up to date phone book. The initial pairing communication as discussed above should then also totally or partly run via the video conference management server. In present example, when a device receives an audio signal recognizable as a pairing sound, it would always send the perceived sound level and the following identification to the video conferencing management server, and leave it to the server to relay the information to the right computer and manage the following provision of access to the device from the computer. This could be a reasonable implementation because video conference management programs already have indicated features for managing registered devices and providing access to controlling them remotely. Also, in the setting of a personal computer being paired with a video conference device, it is possible to display presentations, documents and other files and screen contents stored in the computer on the device and for other participants in a conference in which the device participates. The content could be 1 for example/sent from the computer over the communication session as screen shots appearing at the device and in the conference as a presentation.

Figure 2A:
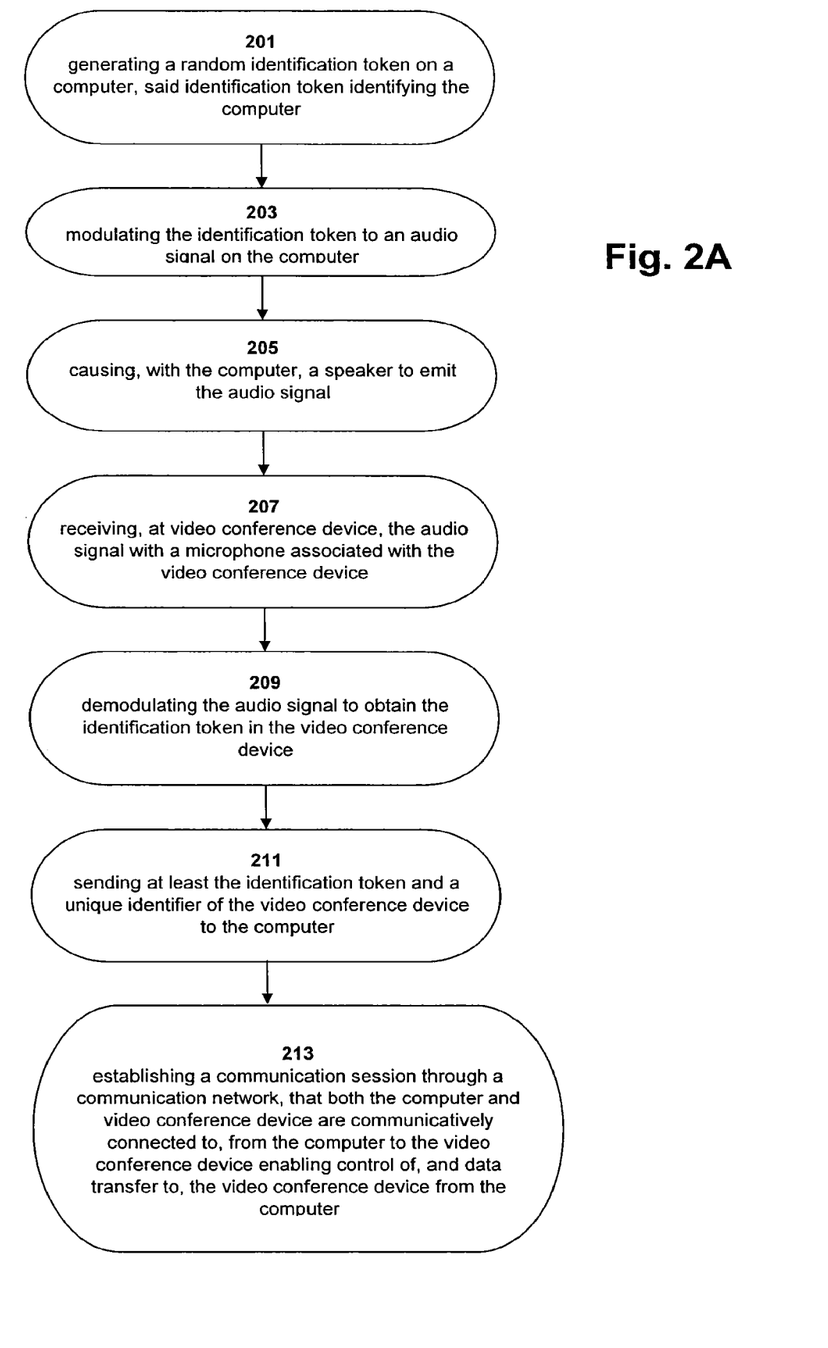
FIGS. 2A-2B are flow charts of exemplary methods.

FIG. 2A illustrates an exemplary method. Step 201 includes generating a random identification token on a computer 1 wherein the identification token identifies the computer. Step 203 includes modulating the identification token to an audio signal on the computer. Step 205 includes causing, with the computer, a speaker to emit the audio signal. Step 207 includes receiving, at video conference device, the audio signal with a microphone associated with the video conference device. Step 209 includes demodulating the audio signal to the identification token in the video conference device. Step 211 includes sending at least the identification token and a unique identifier of the video conference device to the computer. Step 213 includes establishing a communication session through a communication network that both the computer and video conference device are communicatively connected to, from the computer to the video conference device enabling control of, and data transfer to, the video conference device from the computer.

Figure 2B:
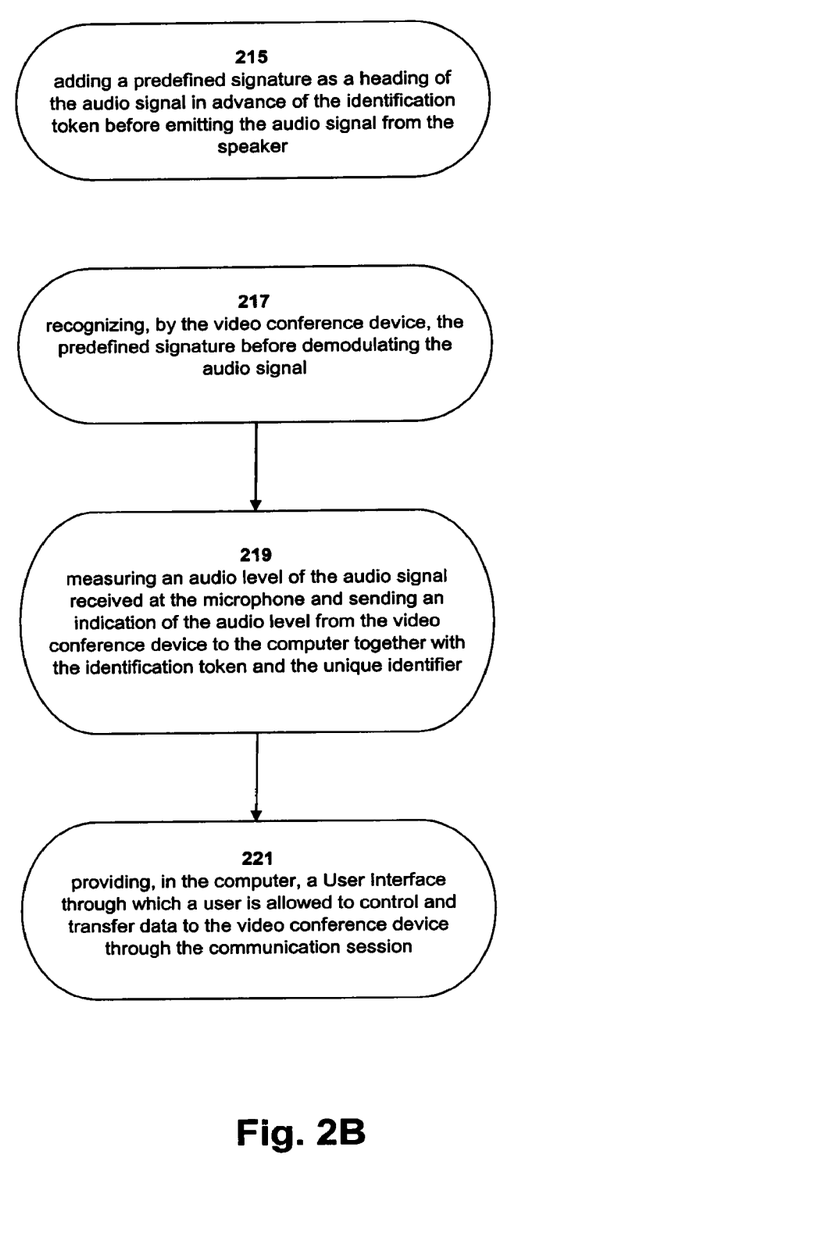

FIG. 2B illustrates an alternative embodiment. This alternative embodiment includes the steps of FIG. 2A, but optionally includes step 215 of adding a predefined signature as a heading of the audio signal in advance of the identification token before emitting the audio signal from the speaker, step 217 of recognizing, by the video conference device, the predefined signature before demodulating the audio signal, step 219 of measuring an audio level of the audio signal received at the microphone and sending an indication of the audio level from the video conference device to the computer together with the identification token and the unique identifier, and step 221 of providing, in the computer, a User Interface through which a user is allowed to control and transfer data to the video conference device through the communication session.

Figure 3:
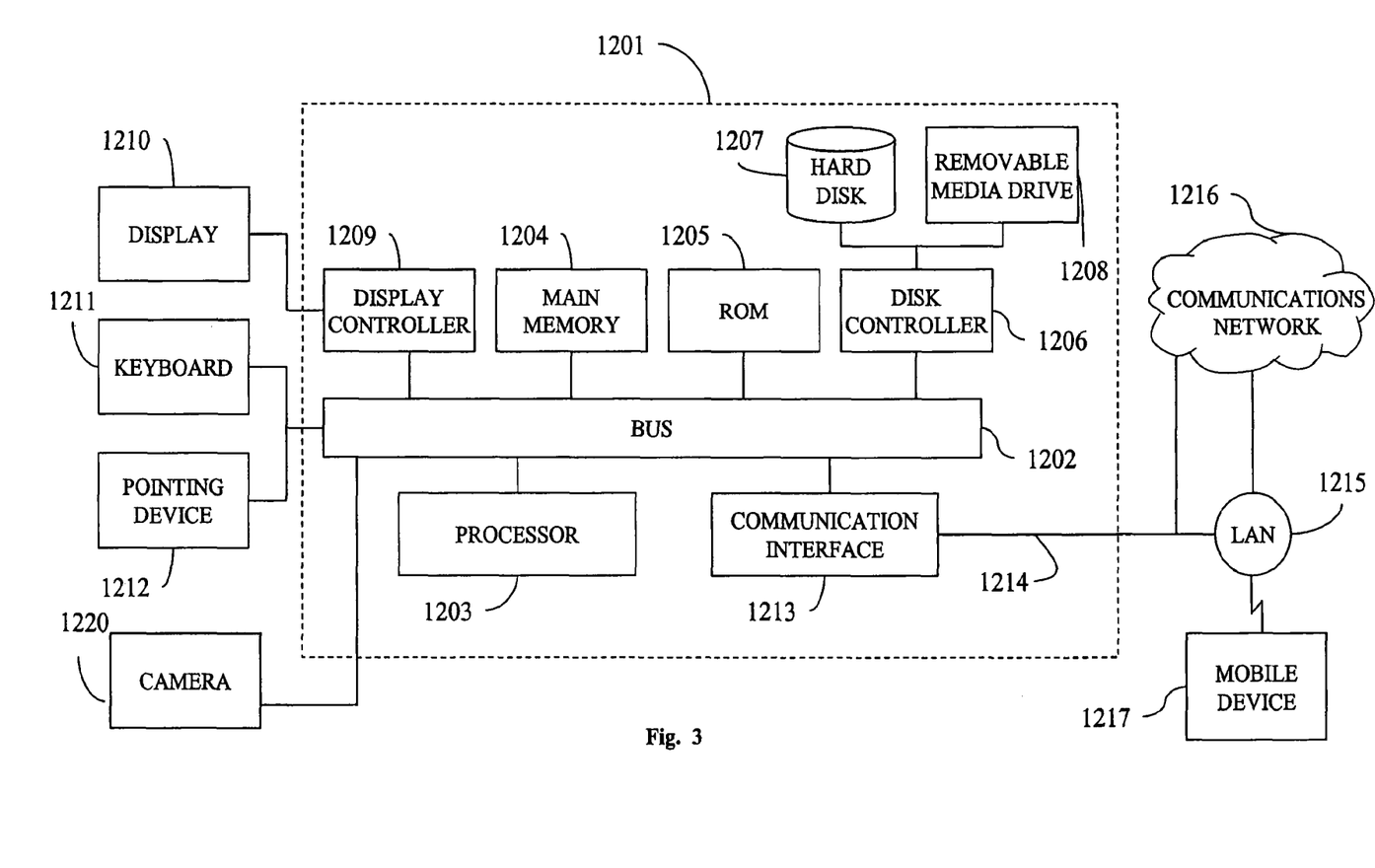
FIG. 3 is a block diagram of an exemplary computer system.

FIG. 3 illustrates a computer system 1201. Computer system 1201 may serve as computer shown in FIG. 1. The computer system 1201 includes a bus 1202 or other communication mechanism for communicating information, and a processor 1203 coupled with the bus 1202 for processing the information. The computer system 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The computer system 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface {SCSI), integrated device electronics (IDE), enhanced-IDE (E-IDE), direct memory access (DMA), or ultraDMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one non-transitory computer readable medium or memory for holding instructions programmed according to the present technological advancement and for containing data structures, tables, records, or other data described herein. Examples of non-transitory computer readable media are compact discs, hard disks, floppy disks, tape, magneto-optical disks, PROMs (EPROM, EEPROM, flash EPROM}, DRAM, SRAM, SDRAM, or any other magnetic medium, compact discs (e.g., CD-ROM}, or any other optical medium, punch cards, paper tape, or other physical medium with patterns of holes. Alternatively, such instructions may also be encoded into a signal.

Stored on any one or on a combination of computer readable media, the present technological advancement may include software for controlling the computer system 1201, for driving a device or devices for implementing the some or all of the above-noted steps, and for enabling the computer system 1201 to interact with a human user (e.g., print production personnel). Such software may include, but is not limited to, device drivers, operating systems, development tools, and applications software.

The computer code devices may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media, volatile media, and transmission media. Non-volatile media includes, for example, optical, magnetic disks, and magneto-optical disks, such as the hard disk 1207 or the removable media drive 1208. Volatile media includes dynamic memory, such as the main memory 1204.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the above-noted steps remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line {ADSL} card, an integrated services digital network (ISDN} card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

The video conferencing device may include the hardware of the computer system illustrated in FIG. 3. However, such hardware would be programmed to implement the above-noted steps performed at the video conferencing device. Exemplary video conferencing devices may include:

Tandberg's Telepresence T3 system, Cisco's TelePresence System 3010, Tandberg's profile series endpoint, Tandberg's EX series, Tandberg's 1700 MXP series, Tandberg's 1000 MXP series.

What is claimed is:

1. A method comprising:
    generating an identification token at a first device;
    emitting a signal based on the identification token, wherein the signal is received at a second device with a sensor and analyzed at the second device, wherein the signal initiates a video conference associated with the first device and the second device;
    receiving, at the first device, at least the identification token and a unique identifier of the second device via a communication network to which both the first device and the second device are connected, communication via the communication network being separate from communication via the signal;
    adding a predefined signature as a heading of the signal in advance of the identification token, wherein the predefined signature identifies compatible video conference devices;
    generating a list of video conference devices having received the signal arranged based on signal level; and
    establishing the video conference through the communication network from the first device to the second device enabling control of the video conference, and data transfer to the second device from the first device.

2. The method according to claim 1, wherein a level of the signal received at the sensor is measured, the method comprising:
    receiving an indication of the level of the signal from the second device with the identification token and the unique identifier.

3. The method according to claim 1, further comprising:
    providing, in the first device, an interface through which a user is allowed to control and transfer data to the second device through the video conference.

4. The method of claim 1, wherein the unique identifier is an internet protocol (IP) address.

5. The method of claim 1, wherein the second device broadcasts a message including the identification token and the unique identifier and the first device identifies the message based on the identification token and uses the message to establish the video conference.

6. A non-transitory computer readable storage medium encoded with instructions, which when executed by a processor causes the processor to implement a method comprising:
    generating an identification token for a first device;
    emitting a signal indicative of the identification token from the first device and data indicative of a signature in a heading of the signal, wherein the signal is received at a sensor of the second device and analyzed by the second device, wherein the signature identifies compatible devices, wherein the second device is added to a list of video conference devices based on the signal received at the sensor;
    receiving the identification token and a unique identifier from the second device via a communication network to which both the first device and the second device are connected, communication via the communication network being separate from communication via the signal;
    generating a list of video conference devices having received the signal, wherein the list is based on signal strength; and
    establishing a video conference through the communication network from the first device to the second device enabling control of the video conference, and data transfer to the second device from the first device.

7. The non-transitory computer readable storage medium according to claim 6, wherein the method further comprises:
    providing, at the first device, an interface configured to receive one or more user commands to control and transfer data to the second device through the video conference.

8. The non-transitory computer readable storage medium according to claim 6, wherein the method further comprises:
    receiving an indication of a signal level of the signal received at the sensor, wherein, in response to the indication, the second device is added to a list of devices having received the signal sorted by signal level in the interface.

9. The non-transitory computer readable storage medium according to claim 6, wherein the unique identifier is an internet protocol (IP) address.

10. The non-transitory computer readable storage medium according to claim 6, wherein the signal is emitted in a meeting room.

11. A system comprising:
a first device; and
a second device communicatively coupled to the first device through a communication network, wherein
the first device is configured to generate a random identification token identifying the first device and generate a signature for compatibility of the first device,
the first device is configured to send a signal including the random identification token identifying the first device and a heading of the signal including the signature,
the second device is configured to receive the signal with a sensor associated with the second device,
the second device is configured to analyze the signal to obtain the identification token,
the second device is configured to send at least the identification token received via the signal and a unique identifier of the second device to the first device via the communication network, communication via the communication network being separate from communication via the signal, and
the first device is configured to establish, in response to the signal, a video conference through the communication network, that enables control of the video conference, and data transfer to the second device from the first device,
wherein a list of video conference devices having received the signal is generated based on signal level.

12. The system according to claim 11, wherein the second device is configured to measure a level of the signal received at the sensor and to send an indication of the level to the first device together with the identification token and the unique identifier.

13. The system according to claim 11, wherein the first device includes an interface configured to receive a user command to control or transfer data to the second device through the communication video conference.

14. The system of claim 11, wherein the unique identifier is an internet protocol (IP) address.

15. A non-transitory computer readable storage medium encoded with instructions, which when executed by a processor causes the processor to implement a method comprising:
generating an identification token for a first device;
emitting a signal indicative of the identification token from the first device and data indicative of a signature in a heading of the signal, wherein the signal is received at a sensor of the second device and analyzed by the second device, wherein the signature identifies compatible devices having received the signal sorted by signal level in the interface;
receiving an indication of a signal level of the signal received at the sensor;
adding, in response to the indication, the second device to a list of devices having received the signal sorted by signal level in the interface;
receiving the identification token and a unique identifier from the second device via a communication network to which both the first device and the second device are connected, communication via the communication network being separate from communication via the signal; and
establishing a communication session through the communication network from the first device to the second device enabling control of, and data transfer to, the second device from the first device.

\* \* \* \* \*